United States Patent
Salter et al.

(10) Patent No.: US 9,290,123 B2
(45) Date of Patent: Mar. 22, 2016

(54) VEHICLE LIGHT SYSTEM WITH ILLUMINATING ROOF RACK

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/508,793

(22) Filed: Oct. 7, 2014

(65) Prior Publication Data

US 2015/0138803 A1    May 21, 2015

Related U.S. Application Data

(63) Continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 11/00* | (2006.01) |
| *B60R 9/04* | (2006.01) |
| *B60Q 1/32* | (2006.01) |
| *F21S 8/10* | (2006.01) |

(52) U.S. Cl.
CPC ............. *B60Q 1/2661* (2013.01); *B60Q 1/32* (2013.01); *B60R 9/04* (2013.01); *F21S 48/214* (2013.01)

(58) Field of Classification Search
CPC ....... B60Q 1/2661; B60Q 1/0017; B60R 9/04
USPC ......................................................... 362/493
See application file for complete search history.

(56) References Cited

U.S. PATENT DOCUMENTS

| | | | |
|---|---|---|---|
| 2,486,859 A * | 11/1949 | Meijer | 40/543 |
| 4,800,470 A * | 1/1989 | Hartsaw | 362/493 |
| 6,114,954 A * | 9/2000 | Palett et al. | |
| 6,729,738 B2 | 5/2004 | Fuwausa et al. | |
| 6,773,129 B2 | 8/2004 | Anderson, Jr. et al. | |
| 6,871,986 B2 | 3/2005 | Yamanaka et al. | |
| 6,990,922 B2 | 1/2006 | Ichikawa et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,753,541 B2 | 7/2010 | Chen et al. | |
| 8,016,465 B2 | 9/2011 | Egerer et al. | |

(Continued)

FOREIGN PATENT DOCUMENTS

| | | |
|---|---|---|
| CN | 201169230 Y | 12/2008 |
| CN | 201193011 Y | 2/2009 |

(Continued)

*Primary Examiner* — Donald Raleigh
(74) *Attorney, Agent, or Firm* — Jason Rogers; Price Heneveld LLP

(57) ABSTRACT

A vehicle lighting system is provided herein. The lighting system includes a roof rack including at least one side rail having a photoluminescent portion configured to illuminate in at least one distinct color due to being excited by at least one wavelength of light. A light source is configured to emit the at least one wavelength of light directed toward the photoluminescent portion. A controller is configured to control a light output of the light source.

17 Claims, 4 Drawing Sheets

(56) References Cited

U.S. PATENT DOCUMENTS

| | | |
|---|---|---|
| 8,203,260 B2 | 6/2012 | Li et al. |
| 8,286,378 B2 | 10/2012 | Martin et al. |
| 8,408,766 B2 | 4/2013 | Wilson et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,631,598 B2 | 1/2014 | Li et al. |
| 2003/0179548 A1 | 9/2003 | Becker et al. |
| 2004/0213088 A1 | 10/2004 | Fuwausa |
| 2006/0087826 A1* | 4/2006 | Anderson, Jr. .................. 362/23 |
| 2009/0219730 A1 | 9/2009 | Syfert et al. |
| 2012/0001406 A1 | 1/2012 | Paxton et al. |
| 2012/0031939 A1* | 2/2012 | Jutila et al. ..................... 224/326 |
| 2013/0335994 A1* | 12/2013 | Mulder et al. .................. 362/555 |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

* cited by examiner

US 9,290,123 B2

VEHICLE LIGHT SYSTEM WITH ILLUMINATING ROOF RACK

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, an illuminating vehicle roof rack is provided. The roof rack includes at least one side rail having a photoluminescent portion configured to illuminate in at least one distinct color due to being excited by at least one wavelength of light. A light source is configured to emit the at least one wavelength of light directed toward the photoluminescent portion.

According to another aspect of the present invention, an illuminating vehicle roof rack is provided. The roof rack includes at least one side rail having a photoluminescent portion configured to illuminate in a first color due to being excited by a first wavelength of light and a second color due to being excited by a second wavelength of light. A light source is configured to emit at least one of the first and second wavelengths of light directed toward the photoluminescent portion.

According to another aspect of the present invention, a vehicle lighting system is provided. The lighting system includes a roof rack including at least one side rail having a photoluminescent portion configured to illuminate in at least one distinct color due to being excited by at least one wavelength of light. A light source is configured to emit the at least one wavelength of light directed toward the photoluminescent portion. A controller is configured to control a light output of the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lighting system that is implemented using an illuminating roof rack. The illuminating roof rack may advantageously employ one or more photoluminescent structures configured to convert light received from an associated light source and re-emit the light at a different wavelength typically found in the visible spectrum. In so doing, a variety of lighting effects may be generated.

Figure 1A:
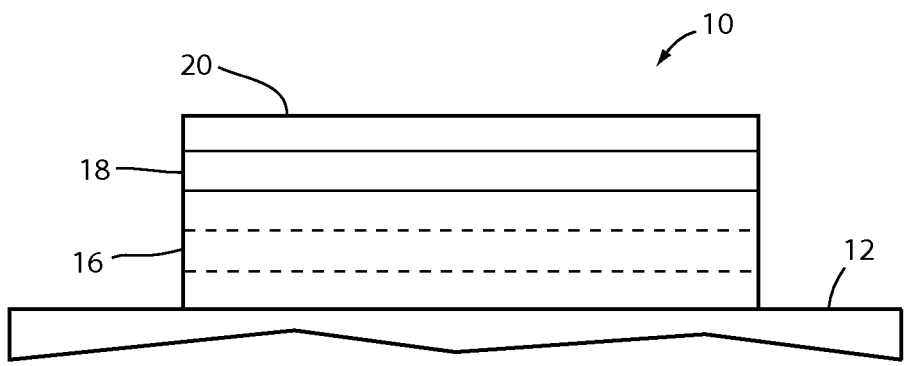
FIG. 1A illustrates a photoluminescent structure coupled to a support member, according to one embodiment.
Figure 1B:
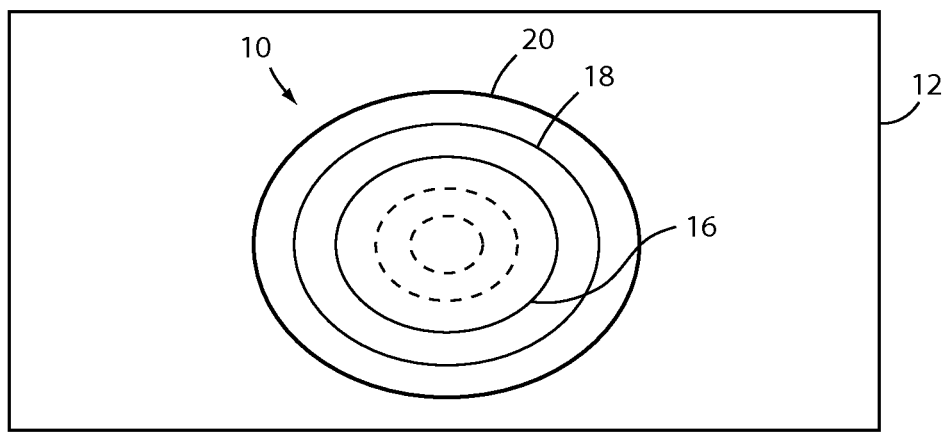
FIG. 1B illustrates a photoluminescent structure coupled to a support member, according to another embodiment.
Figure 1C:
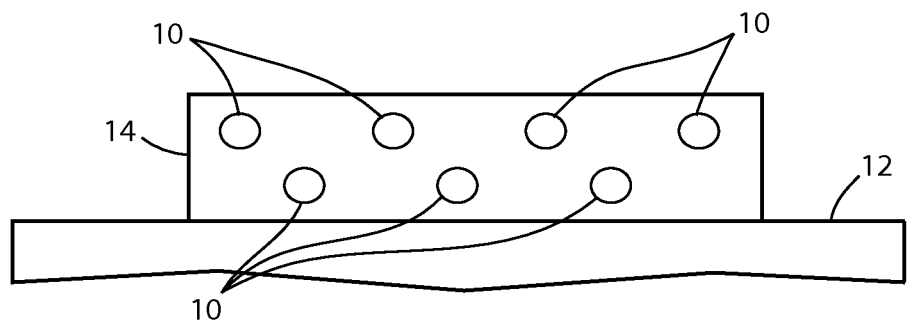
FIG. 1C illustrates a photoluminescent structure coupled to a support member, according to yet another embodiment.

Referring to FIGS. 1A-1C, various exemplary embodiments of a photoluminescent structure 10 are shown, each capable of being coupled to a support member 12. In FIG. 1A, the photoluminescent structure 10 is generally shown rendered as a coating (e.g. a film) that may be applied to a surface of the support member 12. In FIG. 1B, the photoluminescent structure 10 is generally shown as a discrete particle capable of being integrated with a support member 12. In FIG. 1C, the photoluminescent structure 10 is generally shown as a plurality of discrete particles that may be incorporated into a support medium 14 (e.g. a film) that may then be applied (as shown) or integrated with the support member 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired support member. The energy conversion layer 16 may be applied to a support member by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a support member using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
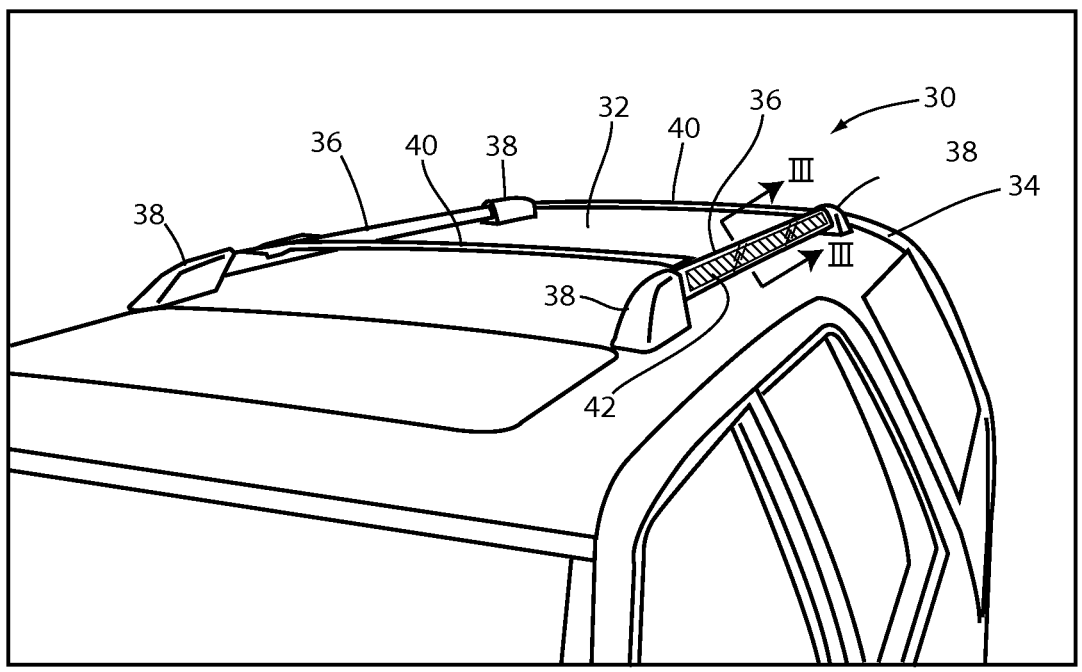
FIG. 2 is a perspective view of an illuminating roof rack mounted to a roof of an automotive vehicle.

Referring to FIG. 2, an illuminating roof rack 30 is generally shown coupled to a roof 32 of an automotive vehicle 34. The roof rack 30 may include a pair of side rails 36 that extend longitudinally along the roof 32 of the vehicle 34. The side rails may be connected to the roof 32 via a plurality of legs 38 and connected to each other via one or more crossbars 40. Each side rail 36 may include a photoluminescent portion 42 configured to illuminate in at least one distinct color due to being excited by at least one wavelength of light. The illumination of the photoluminescent portion 42 may serve as a styling feature of the vehicle 34. Additionally or alternatively, the illumination of the photoluminescent portion 42 may serve to provide a variety of visual notifications to individuals entering or exiting the vehicle 34 as well as other individuals in the general vicinity of the vehicle 34.

Figure 3:
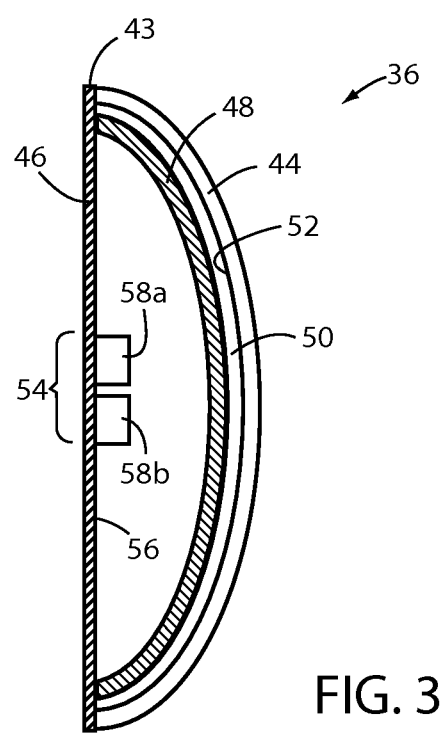
FIG. 3 is a cross-sectional view of a side rail of the roof rack taken along lines III-III of FIG. 2.

Referring to FIG. 3, a cross-sectional view of a side rail 36 is shown. The side rail 36 may include a housing 43 having a light-permeable portion 44 and a light-directing portion 46. The side rail 36 may also include at least one photoluminescent structure 48 and an optional metalized layer 50 that is light-permeable, both of which are coupled to an inner surface 52 of the light-permeable portion 44. The metalized layer 50 functions to impart a metallic appearance to the light-permeable portion 44 of the side rail 36 and may be coated to the inner surface 52 thereof via partial vacuum deposition. The photoluminescent structure 48 may be rendered as a film and applied directly to the inner surface 52 of the light-permeable portion 44 or the metalized layer 50 when applicable. Alternatively, the photoluminescent structure 48 may be incorporated with the light-permeable portion 44 via injection molding or other means. The photoluminescent structure 48 and the metalized layer 50 may both be located between the light-permeable portion 44 and the light-directing portion 46. Further, the metalized layer 50 may be located between the photoluminescent structure 48 and the light-permeable portion 44. According to one embodiment, the photoluminescent structure 48 covers a substantial lateral and longitudinal extent of the inner surface 52 of the light-permeable portion 44 to define the photoluminescent portion 42 shown in FIG. 1

Figure 4:
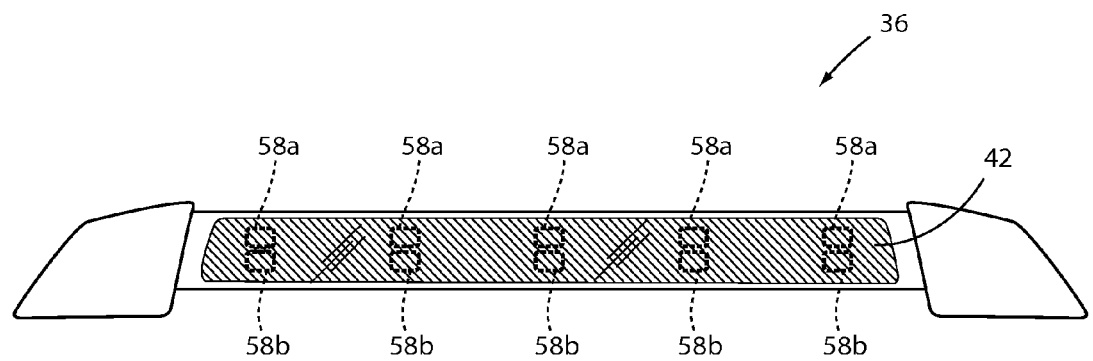
FIG. 4 is a front view of the side rail shown in FIG. 2.

Referring still to FIG. 3, the side rail 36 may further include a light source 54 located within the housing 43 to illuminate the photoluminescent structure 48 in a backlit configuration. The light source 54 may be coupled to an inner surface 56 of the light-directing portion 46 and positioned to face the photoluminescent structure 48. In addition, the light source 54 may include a plurality of light emitting diodes (LEDs) 58a, 58b arranged in pairs that are spaced longitudinally along the inner surface 56 of the light-directing portion 46 (see FIG. 4). The light source 54 may be operable to activate LEDs 58a and 58b in any combination to emit non-focused light to illuminate the entirety of the photoluminescent portion 44 of the side rail 36.

Figure 5:
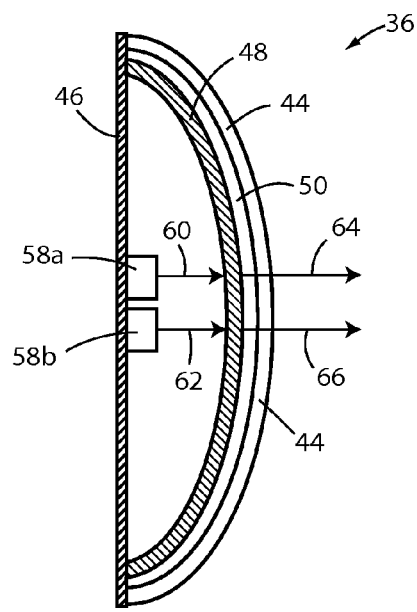
FIG. 5 illustrates a light conversion process being implemented using the side rail shown in FIG. 3.

According to the embodiment shown in FIG. 5, LEDs 58a may be configured to emit a first wavelength of light 60 and LEDs 58b may be configured to emit a second wavelength of light 62 having a different wavelength than the first wavelength of light. The photoluminescent structure 48 may be configured to convert the first wavelength of light 60 to a third wavelength of light 64 and the second wavelength of light 62 to a fourth wavelength of light 66. For purposes of clarity, the wavelengths of light 60-66 are each exemplarily shown by a single associated light ray in FIG. 5. It should be understood that light emitted from the LEDs 58a, 58b may be evenly distributed across the photoluminescent structure 48. Additionally, the emission of light from the photoluminescent structure 48 may be substantially Lambertian, that is, the apparent brightness of the photoluminescent portion 42 is substantially constant regardless of an observer's angle of view. One consequence of Lambertian emission is that the third and fourth wavelengths of light 64, 66 may be emitted from the photoluminescent structure 48 in a forward direction, as shown, or in a rearward direction (i.e. toward the light-directing portion 46). By virtue of the orientation of the side rail 36 in FIG. 1, the photoluminescent portion 42 is more readily viewed from the forward position. As such, the light-directing portion 46 may be configured to redirect any third and fourth wavelengths of light 64, 66 that are incident thereon back toward the photoluminescent structure 48 to be outputted therefrom in the forward direction, thereby increasing the illumination of the photoluminescent portion 42. Light emitted from the photoluminescent structure 48 in the forward direction is transmitted through the metalized layer 50 and the light-permeable portion 44 before being outputted from the side rail 36.

The conversion of the first and second wavelengths of light 60, 62 to the third and fourth wavelengths of light 64, 66, respectively, may occur via the process of down conversion, as described previously above. According to one embodiment, the first and second wavelengths of light 60, 62 may each correspond to either ultraviolet light (e.g. ~10-400 nanometers in wavelength), violet light (~380-450 nanometers in wavelength), or blue light (e.g. ~450-495 nanometers in wavelength), whereas the third and fourth wavelengths of light 64, 66 may each correspond to visible light of a longer wavelength. As defined herein, visible light includes the portion of the electromagnetic spectrum that can be detected by the human eye (e.g. ~390-700 nanometers in wavelength) and may be expressed in a variety of colors defined by a single wavelength (e.g. red, green, blue) or a mixture of multiple wavelengths (e.g. white). Thus, it should be understood that the photoluminescent structure 48 may be configured such that the third and fourth wavelengths of light 64, 66 emitted therefrom may be individually expressed as unicolored or multicolored light. According to one implementation, the third wavelength of light 64 is expressed as a first color (e.g. white) and the second wavelength of light 66 is expressed as a second color (e.g. red) that is visually distinct from the first color.

Figure 6:
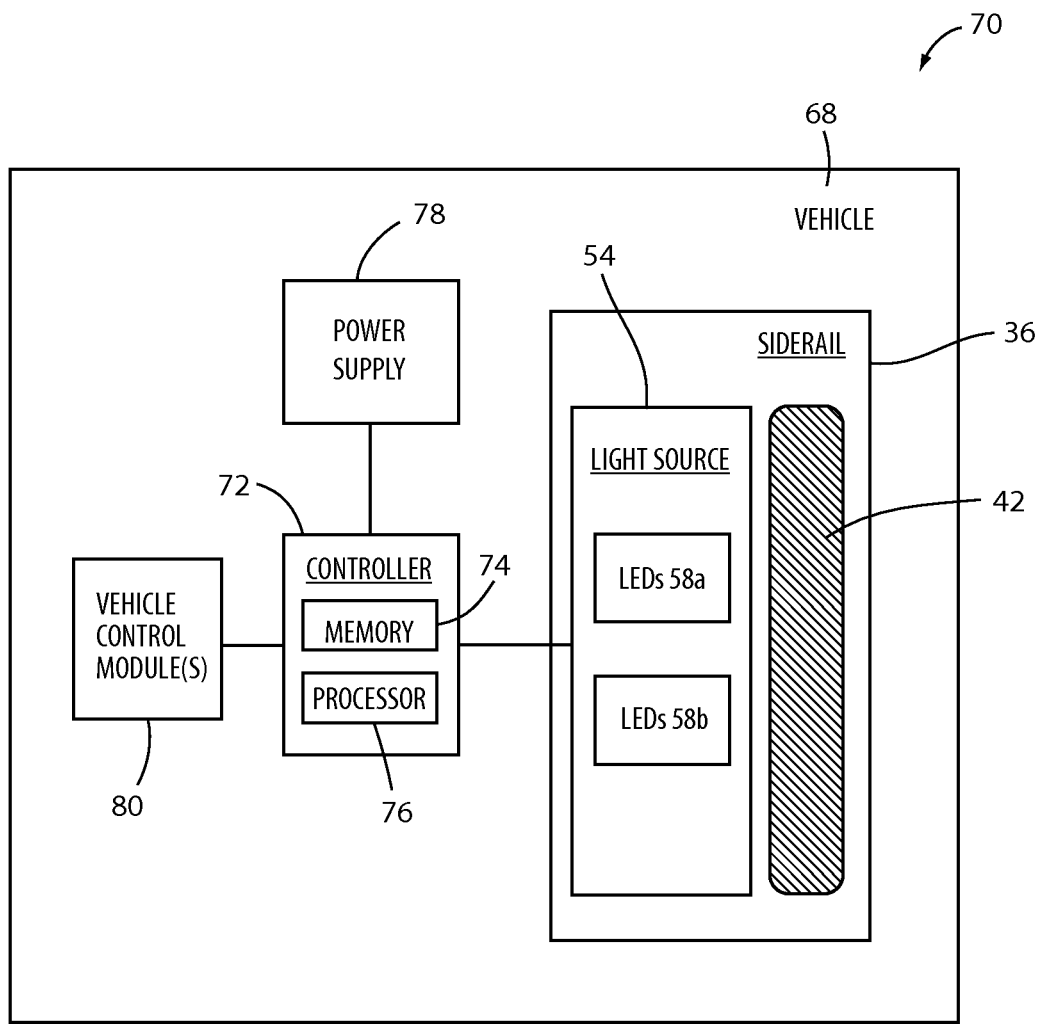
FIG. 6 is a box diagram of a vehicle lighting system.

Referring to FIG. 6, a box diagram of a vehicle 68 is shown in which a vehicle lighting system 70 is implemented using at least one side rail 36. The vehicle lighting system 70 includes a controller 72 in communication with the light source 54 of the side rail 36. The controller 72 may include a memory 74 having instructions contained therein that are executed by a processor 76 of the controller 72. The controller 72 may provide electrical power to the light source 54 via a power supply 78 located onboard the vehicle 68. In addition, the controller 72 may be configured to control the light output of each light source 54 based on feedback received from one or more vehicle control modules 78 such as, but not limited to, a body control module, engine control module, steering control module, brake control module, the like, or a combination thereof. By controlling the light output of the light source 54, the photoluminescent portion 42 may illuminate in a variety of colors and/or patterns to provide ambient light or useful vehicle information to an intended observer. For example, the illumination provided by the photoluminescent portion 42 may be used for numerous vehicle applications, such as, but not limited to, a car finding feature, a remote start indicator, a door lock indicator, a door ajar indicator, a warning indicator, a turn indicator, a break indicator, etc.

In operation, the photoluminescent portion 42 may exhibit a constant unicolor or multicolor illumination. For example, the controller 72 may prompt the light source 54 to emit only the first wavelength of light 60 via LEDs 58a to cause the photoluminescent portion 42 to illuminate in the first color (e.g. white). Alternatively, the controller 72 may prompt the light source 54 to emit only the second wavelength of light 62 via LEDs 58b to cause the photoluminescent portion 42 to illuminate in the second color (e.g. red). Alternatively still, the controller 72 may prompt the light source 54 to simultaneously emit the first and second wavelengths of light 60, 62 to cause the photoluminescent portion 42 to illuminate in a third color (e.g. pinkish) defined by an additive light mixture of the first and second colors.

In another implementation, the photoluminescent portion 42 may exhibit periodic unicolor or multicolor illumination. For example, the controller 72 may prompt the light source 54 to periodically emit (e.g., pulse) only the first wavelength of light via LEDs 58a to cause the photoluminescent portion 42 to periodically illuminate in the first color. Alternatively, the controller 72 may prompt the light source 54 to periodically emit only the second wavelength of light via LEDs 58b to cause the photoluminescent portion 42 to periodically illuminate in the second color. Alternatively, the controller 72 may prompt the light source 54 to simultaneously and periodically emit the first and second wavelengths of light to cause the photoluminescent portion to periodically illuminate in a third color defined by an additive light mixture of the first and second colors. Alternatively still, the controller 72 may prompt the light source 54 to alternate between periodically emitting the first and second wavelengths of light to cause the photoluminescent portion 42 to periodically illuminate by alternating between the first and second colors. The controller 72 may prompt the light source 54 to periodically emit the first and/or second wavelengths of light at a regular time interval and/or an irregular time interval. With respect to the above examples, the controller 72 may modify the intensity of the emitted first and second wavelengths of light 60, 62 by pulse-width modulation or current control.

Accordingly a vehicle lighting system employing an illuminating roof rack has been advantageously described herein.

The vehicle lighting system may provide various benefits including a simple and cost-effective means to produce a variety of illumination that may be used as a styling feature and/or to inform an intended user of a particular vehicle status.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illuminating vehicle roof rack comprising:
   a light source;
   at least one side rail having a light-permeable portion;
   a photoluminescent structure coupled to the light-permeable portion and configured to luminesce in response to light excitation by the light source; and
   a metallized layer disposed between the photoluminescent structure and the light-permeable portion.

2. The illuminating vehicle roof rack of claim 1, wherein the light source is further configured to emit a first wavelength of light and a second wavelength having a different wavelength than the first wavelength of light.

3. The illuminating vehicle roof rack of claim 2, wherein the photoluminescent structure is configured to luminesce in a first color when excited only by the first wavelength of light and a second color when excited only by the second wavelength of light, wherein the second color is visually distinct from the first color.

4. The illuminating vehicle roof rack of claim 3, wherein the photoluminescent structure is configured to luminesce in a third color when excited by both the first and second wavelengths of light, wherein the third color is defined by an additive light mixture of the first and second colors.

5. The illuminating vehicle roof rack of claim 4, wherein the light source includes a plurality of light emitting diodes facing the photoluminescent structure and spaced longitudinally along an inner surface of the side rail, wherein each light emitting diode is configured to emit one of the first wavelength of light and the second wavelength of light.

6. The illuminating vehicle roof rack of claim 5, wherein the inner surface of the side rail is configured to reflect light.

7. An illuminating vehicle roof rack comprising:
   at least one side rail having a light-permeable portion; and
   a photoluminescent structure coupled to the light-permeable portion and configured to luminesce in response to light excitation by a light source;
   wherein the light source comprises a plurality of light emitting diodes spaced longitudinally along an inner surface of the side rail and arranged to face the photoluminescent structure.

8. The illuminating vehicle roof rack of claim 7, wherein each of the light emitting diodes is configured to emit one of a first wavelength of light and a second wavelength of light.

9. The illuminating vehicle roof rack of claim 8, wherein the photoluminescent structure is configured to luminesce in a first color when excited only by the first wavelength of light and a second color when excited only by the second wavelength of light, and wherein the photoluminescent structure is configured to luminesce in a third color when excited by both the first and second wavelengths of light.

10. The illuminating vehicle roof rack of claim 7, wherein the side rail includes a metalized layer located between the light-permeable portion and the photoluminescent structure.

11. The illuminating vehicle roof rack of claim 7, wherein the inner surface of the side rail is configured to reflect light.

12. A vehicle lighting system comprising:
   a roof rack comprising:
      at least one side rail having a light-permeable portion;
      a photoluminescent structure coupled to the light-permeable portion and configured to luminesce in response to light excitation by a light source;
      wherein the light source comprises a plurality of light emitting diodes spaced longitudinally along an inner surface of the side rail and arranged to face the photoluminescent structure; and
   a controller configured to control a light output of the light source.

13. The vehicle lighting system of claim 12, wherein the light source is configured to emit a first wavelength of light and a second wavelength of light having a different wavelength than the first wavelength of light.

14. The vehicle lighting system of claim 13, wherein the photoluminescent structure is configured to luminesce in a first color when en excited by the first wavelength of light and a second color when excited by the second wavelength of light.

15. The vehicle lighting system of claim 14, wherein the controller is configured to perform at least one of the following steps:
   prompt the light source to emit only the first wavelength of light to cause the photoluminescent structure to luminesce in the first color;
   prompt the light source to emit only the second wavelength of light to cause the photoluminescent structure to luminesce in the second color, and
   prompt the light source to simultaneously emit the first and second wavelengths of light to cause the photoluminescent structure to luminesce in a third color defined by an additive light mixture of the first and second colors;
   wherein the third color is visually distinct from the first and second colors.

16. The vehicle lighting system of claim 14, wherein the controller is configured to perform at least one of the following steps:
   prompt the light source to periodically emit only the first wavelength of light to cause the photoluminescent structure to periodically luminesce in the first color;
   prompt the light source to periodically emit only the second wavelength of light to cause the photoluminescent structure to periodically luminesce in the second color,
   prompt the light source to simultaneously and periodically emit the first and second wavelengths of light to cause the photoluminescent structure to periodically luminesce in a third color defined by an additive light mixture of the first and second colors; and
   prompt the light source to alternate between pulsing the first and second wavelengths of light to cause the photoluminescent structure to periodically luminesce by alternating between the first and second colors.

17. The vehicle lighting system of claim 16, wherein the controller is configured to prompt the light source to periodically emit at least one of the first and second wavelengths at one of a regular time interval and an irregular time interval.

* * * * *